United States Patent [19]

Saruki et al.

[11] Patent Number: 5,234,096
[45] Date of Patent: Aug. 10, 1993

[54] HANGER TILT MECHANISM FOR HANGING TRANSPORTATION APPARATUS

[75] Inventors: Takashi Saruki; Hiromi Shibata, both of Kakogawa, Japan

[73] Assignee: Tsubakimoto Chain Co., Osaka, Japan

[21] Appl. No.: 832,920

[22] Filed: Feb. 10, 1992

[30] Foreign Application Priority Data

Feb. 12, 1991 [JP] Japan .................. 3-011494[U]

[51] Int. Cl.⁵ .............................. B65G 47/24
[52] U.S. Cl. .................... 198/378; 198/680; 105/149
[58] Field of Search .............. 198/377, 378, 680; 105/148, 149, 150, 156, 265

[56]  References Cited
U.S. PATENT DOCUMENTS 2,597,914  5/1952  Whitworth et al. ............ 105/148
3,525,306  8/1970  Edel et al. ..................... 105/149
4,475,462  10/1984  Tsumaki et al. ................ 198/680
5,016,543  5/1991  Ohara et al. .................... 105/149
5,103,739  4/1992  Sawada et al. .................. 105/150

FOREIGN PATENT DOCUMENTS 497213  4/1930  Fed. Rep. of Germany ...... 105/149
54-38393  11/1979  Japan .
54-43798  12/1979  Japan .

Primary Examiner—Joseph E. Valenza
Attorney, Agent, or Firm—Flynn, Thiel, Boutell & Tanis

[57] ABSTRACT

A hanger tilt mechanism for a hanging transportation apparatus in which a carrier traveling along a rail is equipped with a hanger having a circular arc-shaped portion so as to be tiltable. The carrier is further equipped with a driving motor and a tilt mechanism for transmitting a rotational force of the driving motor to the circular arc-shaped portion for tilting the hanger. The tilt mechanism, in a preferred embodiment, includes a chain stretched along the circular arc-shaped portion of the hanger and a sprocket which meshes with the chain and is rotated by the driving motor.

4 Claims, 4 Drawing Sheets

HANGER TILT MECHANISM FOR HANGING TRANSPORTATION APPARATUS

FIELD OF THE INVENTION

The present invention relates to a mechanism for tilting a hanger in a hanging transportation apparatus in which an article is transported by being loaded on a tiltable hanger

BACKGROUND OF THE INVENTION

Conventionally, this type of hanging transportation apparatus is, for example, utilized in a production line for an automotive vehicle, wherein a hanger loading an automotive vehicle body is tilted so as to change the direction of the automotive vehicle body with respect to a worker, thereby improving the assembling working efficiency.

There is disclosed in Japanese Patent 54-38393 a mechanism for tilting a hanger of a hanging transportation apparatus. This hanger tilt mechanism (not shown) is installed on a floor and is engaged with a hanger of the hanging transportation apparatus which travels when the hanger moves into a working location so that the hanger can be tilted in this engaged condition.

Moreover, a hanger tilt mechanism (not shown) described in Japanese Patent 54-43798 is constructed in such a manner that a pinion as provided on a hanger of a hanging transportation apparatus which travels, when the hanger moves into an assembly location, is meshed with a rack which is fixed near a rail on which the hanging transportation apparatus travels, so as to tilt the hanger in accordance with a traveling movement of the hanging transportation apparatus.

However, these known hanger tilt mechanisms include the following problems.

These hanger tilt mechanisms are fixedly installed at a place along a traveling path of the hanging transportation apparatus and are constituted to tilt the hanger from the outside of the hanging transportation apparatus. Therefore, it is not possible to tilt the hanger at a place other than the installation place of the hanger tilt mechanism.

Latter hanger tilt mechanisms are constituted so as to tilt the hanger by utilizing the traveling movement of the hanging transportation apparatus. Therefore, it is not possible to tilt the hanger to a desired tilt angle when the hanging transportation apparatus is not traveling.

To resolve the above problems encountered in the above-described prior art, the present invention provides a hanger tilt mechanism for a hanging transportation apparatus in which a carrier traveling along a rail is equipped with a hanger having a circular arc-shaped portion so as to be tiltable, the carrier being further equipped with a driving motor, and a tilt means which transmits rotational force of the driving motor to the circular arc-shaped portion and tilts the hanger.

The driving motor actuates the tilt means, and the tilt means transmits a rotational force of the driving motor to the circular arc-shaped portion so as to tilt the hanger to reach a desired tilt angle.

DETAILED DESCRIPTION

Figure 1:
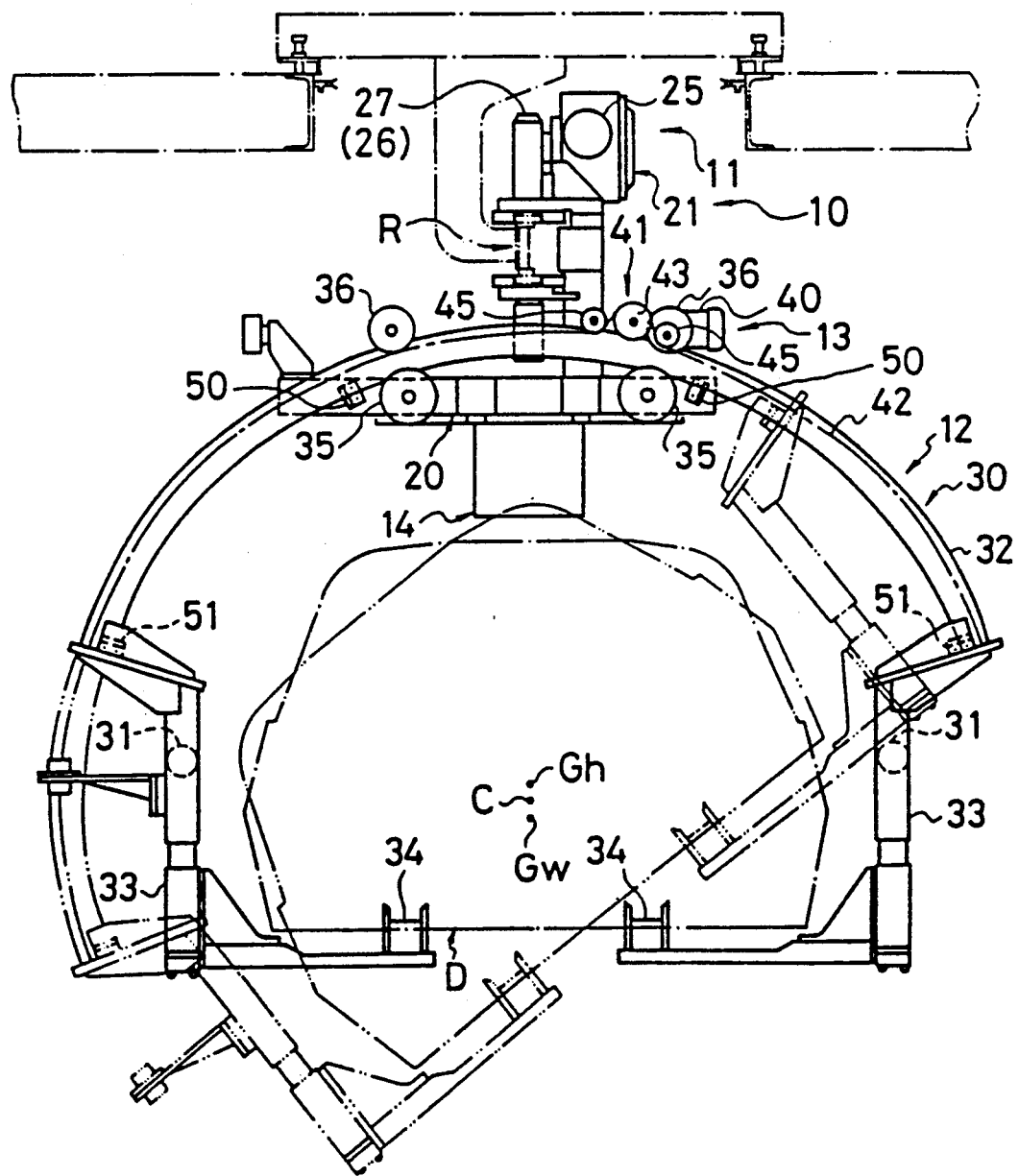
FIG. 1 shows a front view of a hanging transportation apparatus which is equipped with a hanger tilt mechanism in accordance with an embodiment of the present invention.

Hereinafter, referring to the drawings, the embodiment of the present invention is explained.

A hanging transportation apparatus 10 is, for example, an apparatus for conveying an automotive vehicle body D (a transported article) in an automotive vehicle assembling line, which apparatus 10 includes a carrier 11, a hanger 12, a hanger tilt mechanism 13 and a control board 14.

The carrier 11 travels along a rail R, and includes a driving portion 21 and a driven portion 22 which are connected with each other by a carrier frame 20 which is suspended below the rail.

The driving portion 21 includes a driving wheel 26 which is engaged with the rail and is rotated by a traveling motor 25. The driven portion 22 includes a driven wheel 27 engaged with the rail.

The hanger 12 includes a pair of transverse arms 30, 30 joined by a pair of connecting rods 31, 31.

Each of the arms 30, 30 (FIGS. 1 and 2) consists of a circular arc-shaped portion 32 and supporting rods 33, 33 which are connected to opposite ends of the circular arc-shaped rod 32, thus forming a horseshoe-like configuration. The circular arc-shaped rod 32 and the supporting rods 33 are made of pipes. At lower ends of the supporting rods 33, 33, there are provided engaging pins 34, 34 which protrude upwardly for engaging the automotive vehicle body D.

Figure 2:
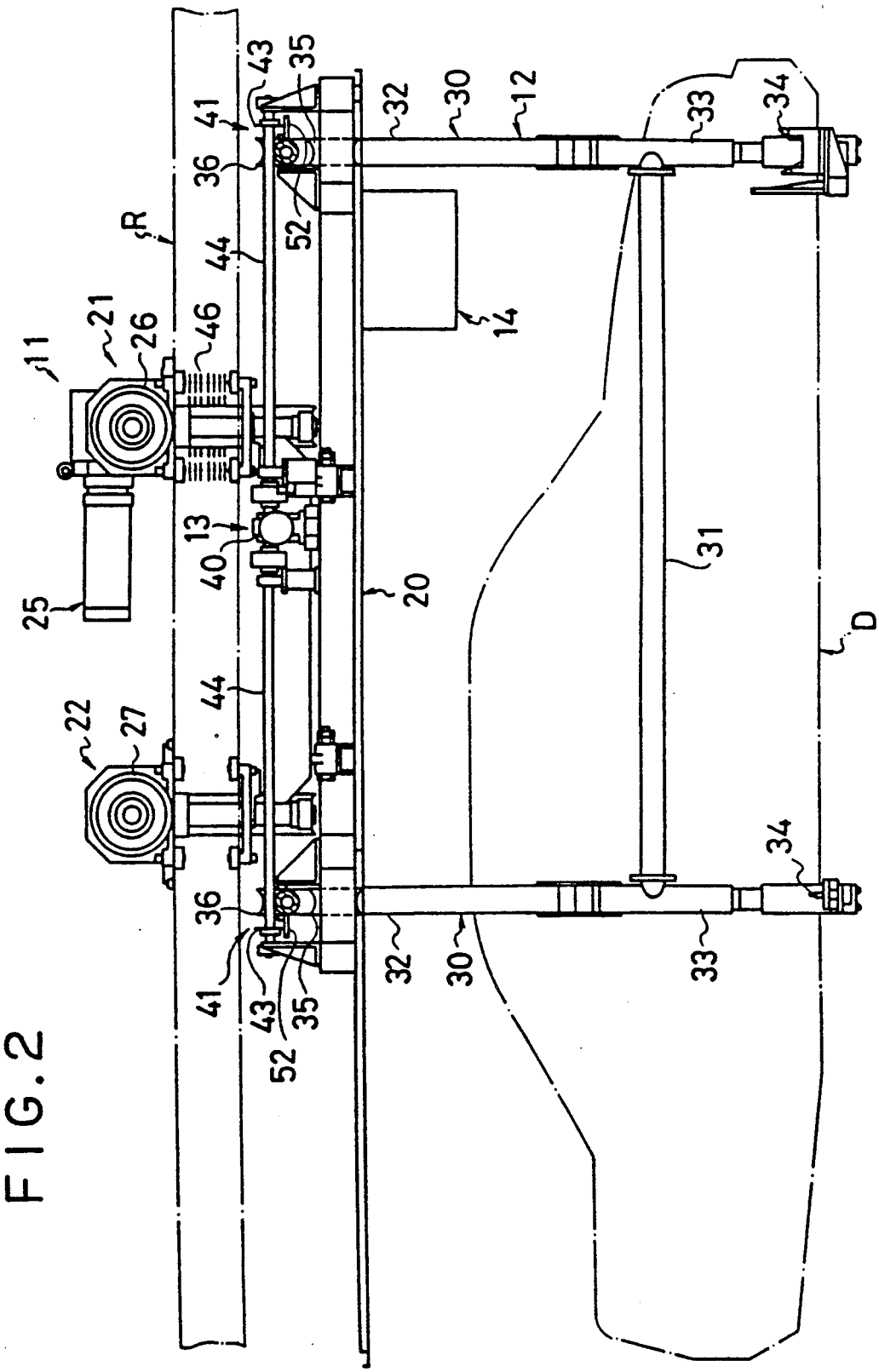
FIG. 2 is a right side view of FIG. 1, a part of which is shown as a cross-sectional view taken along a driving shaft.

Each circular arc-shaped rod 32 is rollingly located between a pair of lower supporting rollers 35, 35 and a pair of upper floating prevention rollers 36, 36, which rollers are all provided on a carrier frame 20. The supporting rollers 35, 35 are, as shown in FIG. 1, when the arm 30 is horizontal, located right above the engaging pins 34, 34, thus increasing stability in an usual transportation of the article.

Accordingly, the hanger 12 is designed so as to be guided and to be shifted by the supporting rollers 35 and the floating prevention rollers 36 and further so as to tilt with respect to the carrier 11. The maximum tilt angle of the hanger 12 is restricted by a stoppage mechanism which includes stoppers 50, 50 provided on the carrier frame 20 and stoppers 51, 51 provided on the hanger 12.

Figure 3:
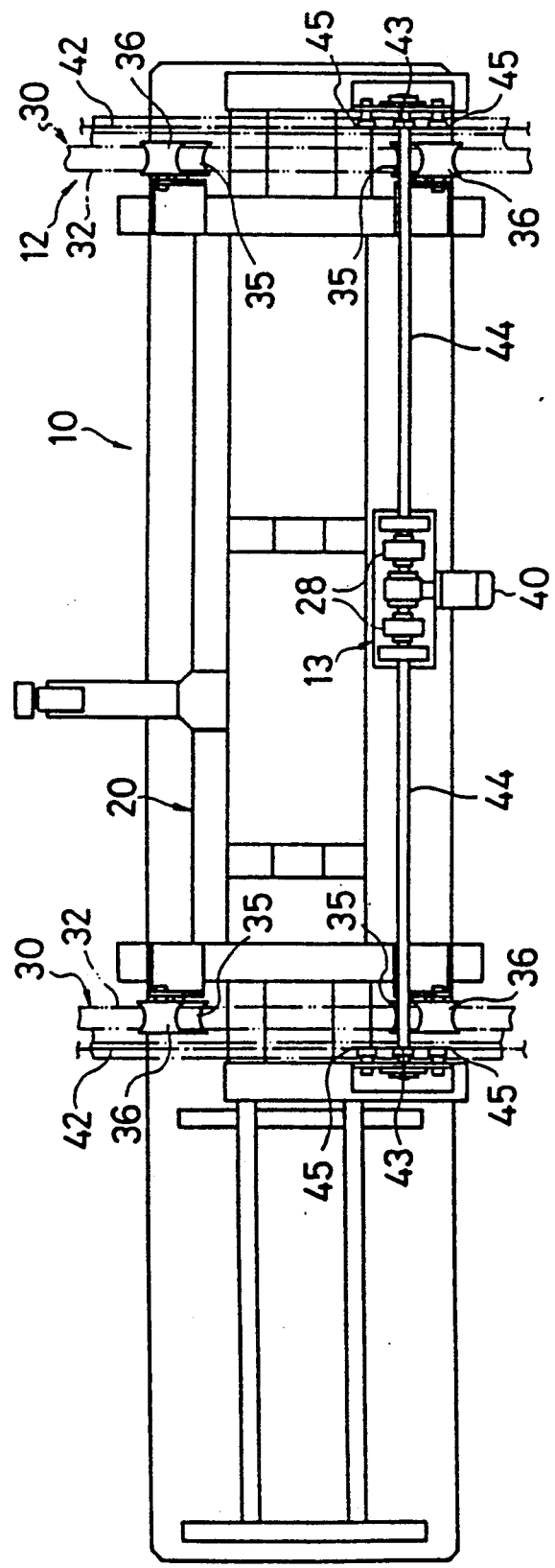
FIG. 3 is a plane view of FIG. 2 in which a carrier portion is omitted.
Figure 4:
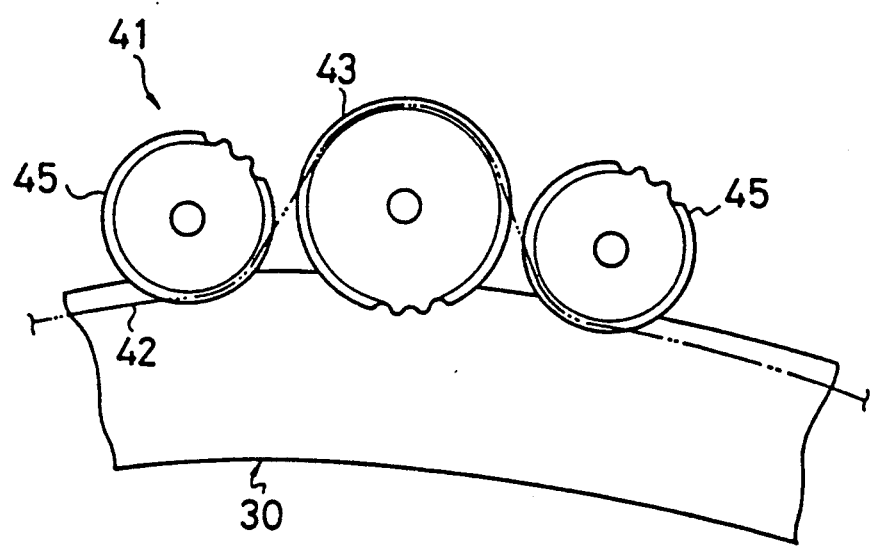
FIG. 4 is an enlarged view showing the sprocket disclosed in FIG. 1.
Figure 5:
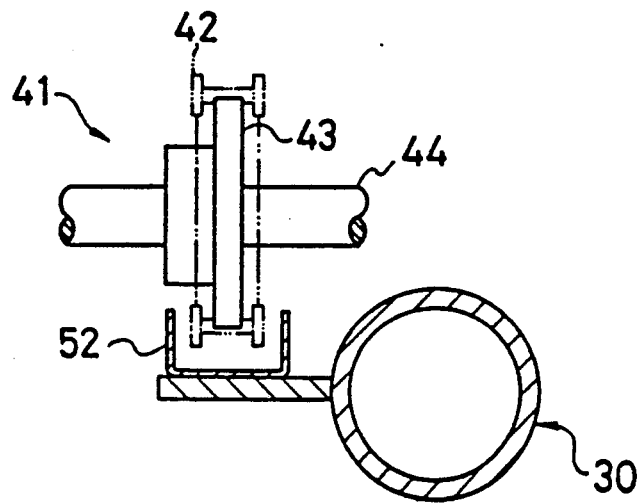
FIG. 5 is an enlarged view showing a periphery of the sprocket shown in the left side of FIG. 2.

The hanger tilt mechanism 13 (FIGS. 1 and 3) is a mechanism for tilting the hanger 12 with respect to the carrier 11, and is constituted by a driving motor 40 and a tilt means 41.

The driving motor 40 is installed substantially at the center of the carrier frame 20 in the longitudinal direction thereof. The driving motor 40 is provided outside the carrier frame 20 so as to face inside, but it can be allowed to provide the driving motor 40 inside the carrier frame 20 so as to face outside.

The tilt means 41 includes chains 42, 42 which are stretched and guided by a chain receiver 52 (FIG. 2) which is provided along side surfaces (both a right side and a left side in FIG. 3) of the circular arc-shaped portions 32, 32 of the hangers 12, 12, and sprockets 43, 43 which are meshed with the chains 42, 42 and are rotated by the driving motor 40.

Since the chain 42 is stretched along a side surface of the circular arc-shaped portion 32, when the automotive vehicle body D is loaded on the hanger 12, it hardly arises that the tightened condition of the chain is changed due to the deflection of the circular arc-shaped portion 32.

The sprockets 43, 43 are connected to the driving motor 40 via driving shafts 44, 44, respectively. The driving shafts 44, 44 and the driving motor 40 are connected with each other by couplings 28, 28 which function to absorb vibrations. Moreover, adjacent each sprockets 43, there are provided a pair of idler sprockets 45 and 45 which press the chain 42 from the top in order to hold the meshing engagement with the chain 42 so as to prevent the chain from coming off. There is further provided a clearance (not shown) between a chain portion which meshes with the idler sprockets 45, 45 and the chain receiver 52 so that the idler sprockets 45, 45 and the chain receiver 52 do not interfere with each other due to the bending error of the circular arc-shaped portion 32, the deflection caused when the workpiece W is loaded on the arm 30, and so on.

At both ends of the chain 42, there are provided chain tension adjusting mechanisms (not shown) which are capable of adjusting the tension of both the right half side and the left half side of the chain as disposed on opposite sides of the sprocket 43. These chain tension adjusting mechanisms are required to be installed on both ends of the chains 42, 42. The reason for installing the chain tension adjusting mechanisms at both ends of the chain 42 is such that, in FIG. 1, if only one chain tension adjusting mechanism is installed at the left end of the chain, when the chain tension adjusting mechanism is operated so as to adjust the tension of the right side of the chain as the sprocket 43 is the boundary, the sprocket causes a following rotation in accordance with the adjusting shift movement of the chain, thereby tilting the other arm 30 via the driving shafts 44, 44, and therefore it is feared that there is caused a dislocation in the mutual locational relationship between the pair of arms 30, 30. That is, it becomes possible to prevent the following rotation of the sprocket by providing the chain tension adjusting mechanisms at both ends of the chain 42.

Moreover, instead of the chain 42 and the sprocket 43, one can use a circular arc-shaped rack (not shown) provided along the circular arc-shaped rod 32 and a pinion (not shown) which meshes with this rack.

Furthermore, the center of gravity Gh of the hanger and the center of gravity Gw of the workpiece are usually located at an upper side and a lower side of the tilt center C of the hanger 12 as shown in FIG. 1, however it is also allowed to select the positions of the center of gravity Gh of the hanger and the center of gravity Gw of the workpiece so as to coincide with the tilt center C.

The operation will now be briefly explained.

The hanging transportation apparatus 10 loads the automotive vehicle body D on the hanger 12, and travels on the rail R by the traveling motor 25, and stops at a predetermined place for assembling and manufacturing steps.

The stopped hanging transportation apparatus 10 actuates the driving motor 40. The rotational force of the driving motor 40 is transmitted to the sprockets 43 through the driving shafts 44. The sprockets 43 drive the chains 42 and cause the hanger 12 to undergo a tilt movement. Upon tilting movement of the hanger 12, the automotive vehicle body D is tilted integrally with the hanger 12. The driving motor 40 is stopped when the tilt angle of the hanger 12 reaches a desired angle which is easy for the worker to perform the assembling work and the manufacturing work of the automotive vehicle body D. Such a condition is indicated by the phantom line in FIG. 1.

After finishing the assembling work and the manufacturing work, the hanger 12 is returned to the initial position by reverse rotating of the driving motor 40.

Moreover, the tilt movement of the hanger 12 can be carried out even when the hanging transportation apparatus 10 is traveling. Still further, the traveling motor 25 is controlled by a control signal fed to the control board 14 supplied from the outside via a feed trolley 46.

Accordingly, the hanging transportation apparatus 10 can tilt the hanger 12 at any place along the assembling line since the hanger tilt mechanism 13 is provided on the carrier 11 of the hanging transportation apparatus 10. Thus, it can be easily fitted for any changes in the assembling line.

Moreover, the hanger 12 can be tilted in accordance with the assembling work irrespective of the stopping period of time of the carrier 11 or the traveling period of time of the same.

Further, it is not necessary to provide the hanger tilt mechanism on the traveling path of the carrier 11, and therefore it becomes possible to expand the same amount of available space of the assembling work station in the assembling steps.

Since the hanger is tilted by the chain and sprocket drive, it is possible to absorb the size error of the circular arc-shaped portion of the hanger.

Still further, though the hanging transportation apparatus is constituted to travel by the motor 25, it is possible to constitute the hanging transportation apparatus to be able to travel by the traction of a drive chain (not shown).

In accordance with the hanger tilt mechanism of the present invention, since the hanger tilt mechanism is provided on the carrier itself, the following effects are provided:

It is possible to tilt the hanger at any place on the traveling path of the hanging transportation apparatus.

It is possible to tilt the hanger irrespective of the stopping period of time of the hanging transportation apparatus or the traveling period of time of the same.

It is possible to effectively utilize the space of the traveling path of the hanging transportation apparatus, since it is no longer necessary to provide the hanger tilt mechanism at a location along the traveling path of the hanging transportation apparatus.

And, in accordance with a preferred constitution of the present invention, since the hanger is tilted by the chain and sprocket drive, it is possible to absorb the size error of the circular arc-shaped portion of the hanger.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hanger tilt mechanism for hanging transportation apparatus in which a carrier is moved by a traveling motor along a rail having a feed trolley, said carrier including a hanger having a circular arc-shaped portion disposed on said carrier so as to be tiltable, said carrier further including a driving motor operable at any location of said carrier along said rail and tilt means for transmitting a rotational force of said driving motor to said circular arc-shaped portion for tilting said hanger at any said location, said tilt means including a chain stretched along the circular arc-shaped portion of said hanger and a sprocket which meshes with the chain and is rotated by the driving motor.

2. In a hanging transport apparatus including a hanger assembly which is supported from and movable in a longitudinal direction along a rail, the hanger assembly including a carrier which is supported on and moves along the rail, and a hanger which is mounted on the carrier and is vertically tiltable within a plane which extends substantially perpendicularly with respect to the longitudinal direction of the rail, the improvement comprising: hanger tilt means mounted on and cooperating between said carrier and said hanger for permitting selective vertical tilting of the hanger relative to the carrier at any desired location along the rail, said tilt means including driving motor means mounted on and carried by the carrier and operable at any location of said carrier along said rail, said driving motor means being drivingly coupled to a force-transmitting member on the hanger for tilting said hanger at any said location, said hanger including a generally arc-shaped rail of approximate circular configuration, said arc-shaped rail extending through only a portion of a circle, said arc-shaped rail being disposed substantially within a plane which extends generally perpendicular to the longitudinal direction of the rail, said force-transmitting member being elongated and extending generally along the arc-shaped rail, said arc-shaped rail opening generally downwardly and being movably supported on and projecting downwardly from said carrier, said elongate force-transmitting member comprising an elongate flexible chain which extends along the arc-shaped rail and has opposite ends thereof anchored to the rail, and sprocket means rotatably supported on the carrier and drivingly engaged with the chain, the sprocket means being drivingly coupled to the motor means.

3. A hanger tilt mechanism for a hanging transportation apparatus in which a carrier traveling along a rail includes a hanger having a circular arc-shaped portion disposed on said carrier so as to be tiltable, said carrier further including a driving motor, and tilt means for transmitting a rotational force of said driving motor to said circular arc-shaped portion for tilting said hanger, said tilt means including a chain disposed along said circular arc-shaped portion and a sprocket in mesh with said chain and rotatably driven by said driving motor.

4. In a hanging transport apparatus including a hanger assembly which is supported from and movable in a longitudinal direction along a rail, the hanger assembly including a carrier which is supported on and moves along the rail and a hanger which is mounted on the carrier and which includes an arc-shaped portion that is vertically tiltable within a plane which extends substantially perpendicularly with respect to the longitudinal direction of the rail, the improvement comprising: hanger tilt means mounted on and cooperating between said carrier and said hanger for permitting selective vertical tilting of said arc-shaped portion relative to said carrier at any desired location along the rail, said tilt means including a driving motor mounted on and carried by said carrier, a chain disposed along said arc-shaped portion and fixed at opposite ends to said arc-shaped portion, and a sprocket drivingly engaged with said chain and driven by said driving motor for tilting said hanger.

* * * * *